(12) United States Patent
Hung

(10) Patent No.: US 10,786,861 B2
(45) Date of Patent: Sep. 29, 2020

(54) TUNGSTEN INERT GAS WELDING TORCH WITH IMPROVED AIR COOLED HANDLE

(75) Inventor: Derek Yu-Fung Hung, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 254 days.

(21) Appl. No.: 13/316,936

(22) Filed: Dec. 12, 2011

(65) Prior Publication Data

US 2012/0152909 A1   Jun. 21, 2012

Related U.S. Application Data

(60) Provisional application No. 61/423,870, filed on Dec. 16, 2010.

(51) Int. Cl.
  *B23K 9/167* (2006.01)
  *B23K 9/29* (2006.01)

(52) U.S. Cl.
  CPC ............. *B23K 9/167* (2013.01); *B23K 9/296* (2013.01); *Y10T 29/49826* (2015.01)

(58) Field of Classification Search
  CPC .......... B23K 9/291; B23K 9/296; H05H 1/34
  USPC ............. 219/75, 50, 72, 74, 76.1–77, 78.14, 219/61.12, 145.21, 146.21
  See application file for complete search history.

(56) References Cited

U.S. PATENT DOCUMENTS

| | | | |
|---|---|---|---|
| 2,428,065 A | 9/1947 | Cockrill et al. | |
| 3,469,070 A | 9/1969 | Bernard et al. | |
| 4,727,238 A * | 2/1988 | Mann | B23K 9/325 219/137.31 |
| 5,403,987 A * | 4/1995 | Rehrig | B23K 9/296 219/137.51 |
| 6,399,913 B1 | 6/2002 | Sammons et al. | |
| 6,822,196 B2 * | 11/2004 | Centner | B23K 9/295 219/137.62 |
| 2004/0129682 A1* | 7/2004 | Dunton | B23K 9/296 219/75 |

FOREIGN PATENT DOCUMENTS

KR   20090070579 A   7/2009

OTHER PUBLICATIONS

International Search Report & Written Opinion of PCT/US2011/06479 dated Apr. 12, 2012.

* cited by examiner

*Primary Examiner* — Tu B Hoang
*Assistant Examiner* — Thomas J Ward
(74) *Attorney, Agent, or Firm* — McAndrews Held & Malloy, Ltd.

(57) ABSTRACT

Embodiments of a tungsten inert gas (TIG) welding torch with an improved air cooled handle are provided. The welding torch may include a body, a cable assembly, and a torch head, with a handle placed over the body and the cable assembly. The handle may feature a curved end designed to fit near the torch head without contacting the torch head, providing a closer gripping point to allow greater control of the torch. In addition, the handle may be spaced from the body and the cable assembly to form an air space within the handle through which air may flow to cool the handle.

18 Claims, 4 Drawing Sheets

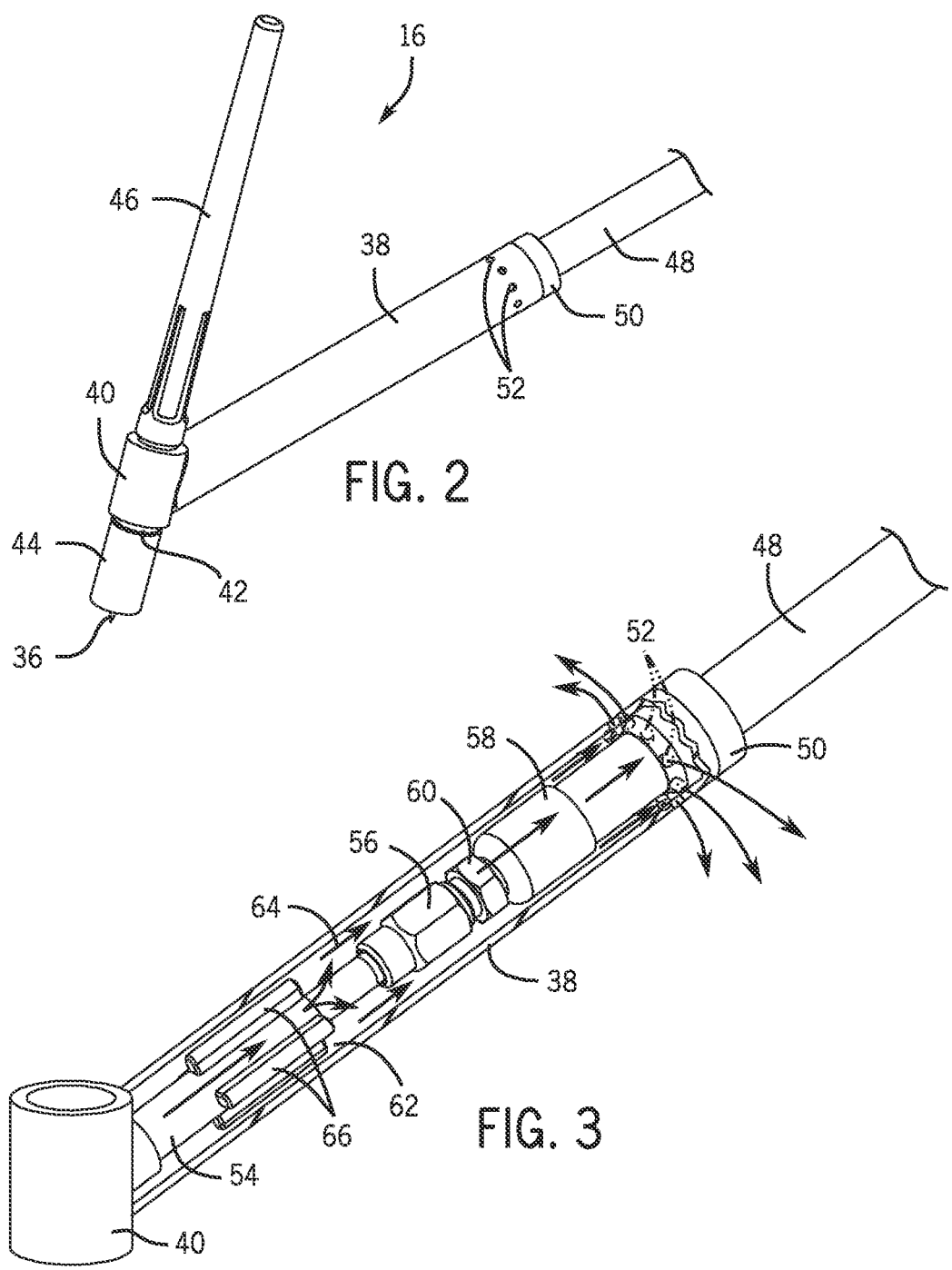

TUNGSTEN INERT GAS WELDING TORCH WITH IMPROVED AIR COOLED HANDLE

CROSS REFERENCE TO RELATED APPLICATIONS

This application is a Non-Provisional Patent Applications of U.S. Provisional Patent Application No. 61/423,870, entitled "Tungsten Inert Gas Welding Torch with Air Insulated Handle", filed Dec. 16, 2010, which is herein incorporated by reference.

BACKGROUND

The invention relates generally to welding systems, and, more particularly, to a tungsten inert gas (TIG) welding torch with an air insulated handle.

Welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In contrast, TIG welding systems employ a non-consumable tungsten electrode that is independent from the filler material. That is, the TIG welding process does not melt the tungsten electrode into the weld forming on the work piece, and the tungsten electrode heats up over a period of use.

Air circulating around the welding torch handle typically prevents the handle from overheating throughout welding operations. However, certain TIG welding applications may generate more heat than circulated ambient air is able to dissipate, and such applications are generally accomplished using liquid cooled TIG torches. Liquid cooled torches may include a number of additional components, such as conduits for conveying liquid to and from a liquid cooling system, which can add bulk to the welding torch, making the torch difficult to maneuver in certain locations. In addition, maneuverability of welding torches may be limited since torch handles typically only reach a certain distance from the torch head to avoid overheating. Welding operators may desire to hold the handle of a TIG welding torch at a position close the torch head, near the tungsten electrode, to have greater control during the welding process. Therefore, there exists a need for a TIG welding torch capable of cooling its handle near the torch head without circulating a liquid coolant.

BRIEF DESCRIPTION

In an exemplary embodiment, a welding torch includes a collar configured to hold an electrode and a body coupled to the collar. The welding torch also includes a cable assembly coupled to the body and extending through a channel formed through the body to supply welding power and shielding gas to the electrode. Further, the welding torch includes a hollow handle placed over the body and the cable assembly and spaced from the body and the cable assembly to form an air space, and the hollow handle includes a curved end configured to fit closely to the torch head.

In another exemplary embodiment, a welding torch includes a collar configured to hold an electrode, the collar being aligned with a collar centerline. The welding torch includes a body coupled to the collar with a channel formed therethrough, the body being aligned with a body centerline that intersects the collar centerline at a non-ninety degree angle. Further, the welding torch includes a cable assembly coupled to the body and configured to deliver gas and electric power to the electrode through the channel. Still further, the welding torch includes a hollow handle placed over the body and the cable assembly and spaced from the body to form an air space, and the handle includes a curved end configured to fit closely to the torch head.

In a further embodiment, a method includes coupling a torch body to a collar configured to hold an electrode and coupling a cable assembly to the body in order for the cable assembly to provide gas and electrical power to the electrode. The method also includes forming a curved edge in an end of a hollow handle configured to fit near an outer edge of the collar. Finally, the method includes disposing the handle over the body and the cable assembly, the handle being spaced from the body and the cable assembly by an air space.

DRAWINGS

These and other features, aspects, and advantages of the present invention will become better understood when the following detailed description is read with reference to the accompanying drawings in which like characters represent like parts throughout the drawings, wherein:

FIG. 2 is a perspective view of the tungsten inert gas (TIG) welding torch of FIG. 1;

FIG. 3 is a perspective view of certain components of the TIG torch of FIG. 1 showing the flow of air therethrough;

DETAILED DESCRIPTION

Figure 1:
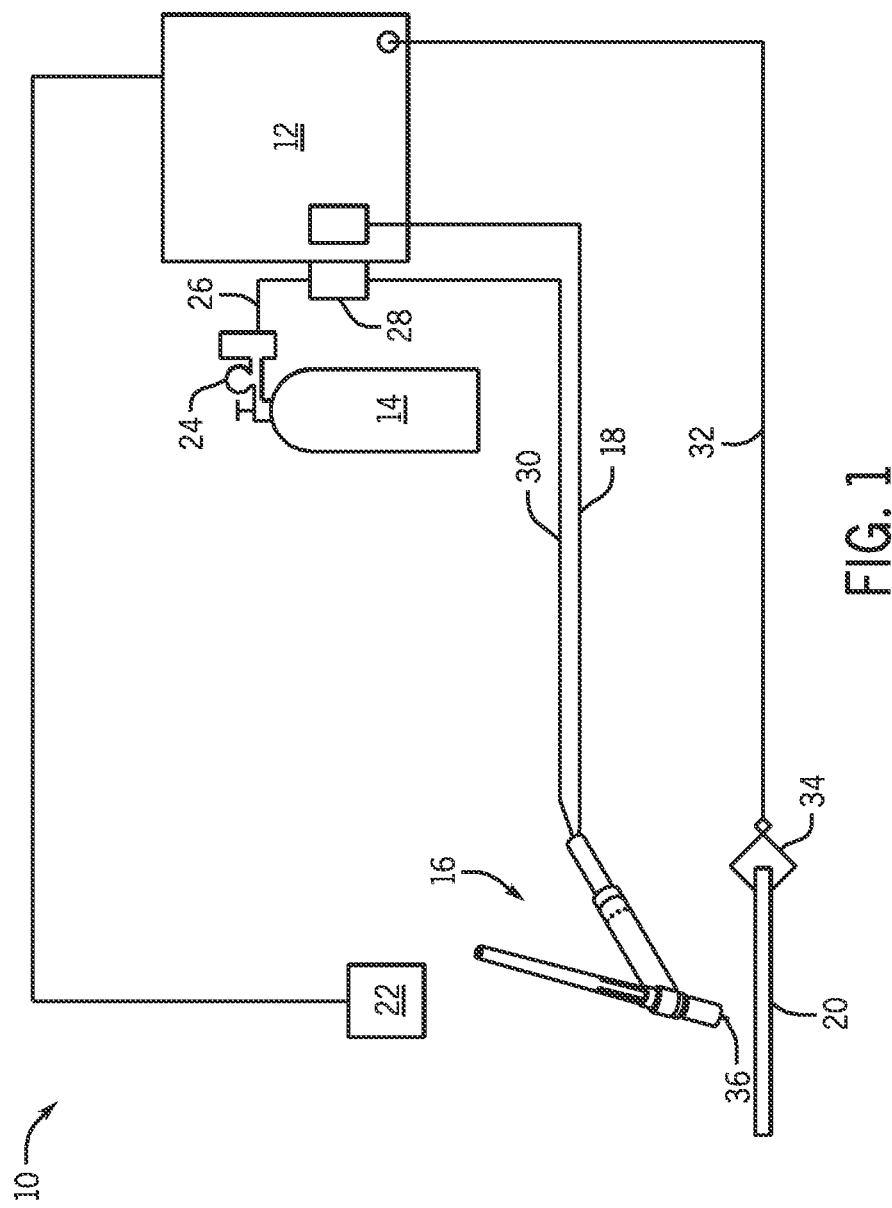
FIG. 1 is a schematic view of an exemplary welding system in accordance with embodiments of the present invention.

Turning now to the figures, FIG. 1 illustrates a tungsten inert gas (TIG) welding system 10 including a power source 12, a shielding gas source 14, and a torch 16. In the illustrated embodiment, the power source 12 provides power to the welding torch 16 via a power supply conduit 18. The power source 12 may supply a direct current (DC) or alternating current (AC) to the torch 16 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 56 Hz) current may generate a wide arc with shallow penetration of a work piece 20, while a high AC frequency (e.g., 200 Hz) current may generate a focused arc with deeper penetration into the work piece 20.

In addition to the frequency of the current, the power source 12 may vary the amperage of the current output to the torch 16. The setting for the amperage output by the power source 12 may be adjusted by a setting a knob or button or other input device on the power source 12, or may be set by a remote control 22. For example, a welding system 10 may include a foot pedal remote control 22 (as illustrated) that allows the operator to make current adjustments during welding by either holding down the foot pedal or feathering the foot pedal remote control 22 to vary the amperage. The remote control 22 may also include a finger tip control, audible command, or other form of input to signal the power source 12 to output a corresponding current.

In addition, the torch 16 may be supplied with a shielding gas from a gas source 14. In general, the shielding gas may be supplied to the torch 16 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

As depicted in FIG. 1, the shielding gas may be provided in a container and delivered to the torch 16 via a regulator 24, a conduit 26, a gas valve 28, and a gas conduit 30. The regulator 24 may allow an operator to limit the pressure of the gas delivered to the gas valve 28 to obtain a desired flow rate. Further, the gas valve 28 may provide for stopping and starting the flow of the shielding gas to the torch 16 in coordination with other welding operations. Although shown mounted on the power source 12, the gas valve 28 may be located at other positions within the welding system 10, e.g., on the torch 16.

In general, the welding system 10 may provide for current flow via a work piece 20 to the power source 12. For example, as depicted in FIG. 1, the welding system 10 may include a cable 32 that is secured to the work piece 20 via a work clamp 34. In this configuration, the current provided by the power source 12 flows through the supply conduit to the torch 16, flows across an arc from an electrode 36 to the work piece 20, and returns to the power source 12 via the work clamp 34 and the cable 32.

FIG. 2 is a perspective view of the torch 16, including a torch handle 38 and a torch head 40. The torch head 40 may be a component of a larger torch body which extends into the handle 38, allowing an operator to hold and manipulate the welding torch 16 via the handle 38. The handle 38 features a hollow interior to facilitate routing power and gas to the electrode 36 and to provide an air space through which circulated air may thermally insulate the handle 38. Other components of the welding torch 16 that are coupled to the torch head 40 may include an insulator 42, a nozzle 44, a collet (not shown), the electrode 36, and a back cap 46. The insulator 42 may be positioned on the interior of the torch head 40 to block heat produced by the welding current from passing into the torch body and/or the handle 38. The nozzle 44, which may be attached to the insulator 42 or the torch head 40, includes a hollow tubular shaped piece that encloses the collet and the electrode 36, providing a path for the shielding gas to pass between an interior surface of the nozzle 44 and the collet. The back cap 46 screws into the torch head 40 to secure the collet and the electrode 36. Back caps 46 of different lengths and nozzles 44 of different sizes may be interchangeable with the same torch body, allowing an operator to use the same torch body in a variety of TIG welding applications.

A cable assembly 48 coupled to the torch body conveys both electrical power and shielding gas to the torch head 40 from the power supply conduit 18 and the gas conduit 30. The handle 38 may be coupled to the cable assembly 48 with a plug 50, creating a seal over an air space within the handle 38. Air may be permitted to enter and exit the handle 38, however, through a space between the handle 38 and the torch head 40 and through apertures 52 formed in the end of the handle 38 near the plug 50. Other embodiments may not feature the plug 50, but instead leave a relatively larger annular space between the handle 38 and the cable assembly 48 through which the air may exit the handle 38.

Certain components of an exemplary welding torch 16 are shown in FIG. 3, including the torch head 40, cable assembly 48, handle 38, and other components contained within the handle 38. As previously mentioned, the torch head 40 is part of a torch body 54 that extends into the handle 38, and shielding gas and power are conveyed through a channel in the torch body 54. To route the gas and power from the cable assembly 48 to the torch body 54, a fastener assembly 56 may connect the cable assembly 48 to the channel through the torch body 54. In addition to a hose, the cable assembly 48 features a ferrule 58 crimped over the hose in order to fasten the cable assembly 48 to a fitting of the fastener assembly 56. The ferrule 58 may be removably coupled with the fastener assembly 56 via this fitting, or a threaded connection, allowing the cable assembly 48 to be detached from the torch 16. The depicted fastener assembly 56 features a number of threaded components (e.g., a nut 60) made from brass and/or copper, although other arrangements and materials are possible. Components of the welding torch, including the handle 38, the torch body 54, the cable assembly 48, the plug 50 and the fastener assembly 56 define an air space 62, described in detail below, and the components may be sized accordingly.

As previously discussed, the torch 16 may convey electricity through the electrode 36 held in the torch head 40 during welding operations, thereby heating the non-consumable electrode 36 over a period of use. Heat may transfer from the electrode 36 to the torch head 40, the torch body 54, and the fastener assembly 56 within the torch 16, but the air space 62 prevents the heat from spreading to an outer surface of the torch handle 38. The air space 62 may insulate the handle 38 from the heated inner components (i.e., torch body 54, fastener assembly 56, ferrule 58) and facilitate the flow of air to convectively cool these inner components, as indicated by arrows 64. Multiple handle supports 66 may extend from the torch body 54 to contact the inner surface of the handle 38, supporting the handle 38 in a fixed position relative the torch body 54 while permitting the flow of air. Air circulating throughout the air space 62 may generally flow from the torch head 40, through spaces between the supports 66, and ultimately toward the apertures 52, as heated air tends to rise through handle 38. Although the illustrated embodiment features circular apertures 52 arranged radially around one end of the handle 38, other arrangements of apertures 52 in the torch handle 38 may be possible. For example, different sizes, shapes, and numbers of apertures 52 may be arranged in one or more rows at the end of the handle 38. Although the illustrated embodiment uses natural convection to cool the inner components of the handle 38, other embodiments may feature one or more small fans or other components that may apply forced convection to the inner components for evacuating hot air from the handle 38.

It should be noted that the handle 38 extends almost entirely to the torch head 40. Such an extended handle 38 may allow a welding operator to grasp the handle 38 at a closer position to the torch head 40, allowing greater maneuverability and control of the welding torch 16 than would be possible with other welding torches. Although the handle 38 approaches the torch head 40, the handle 38 may not contact the outer surface of the torch head 40, as this would cause undesirable heat transfer from the torch head 40 to the outer surface of the handle 38. In addition, a space between the torch head 40 and the handle 38 may permit air to enter the air space 62 and provide convective cooling to the inner components of the torch 16 before exiting through the apertures 52 in the handle 38.

Figure 4:
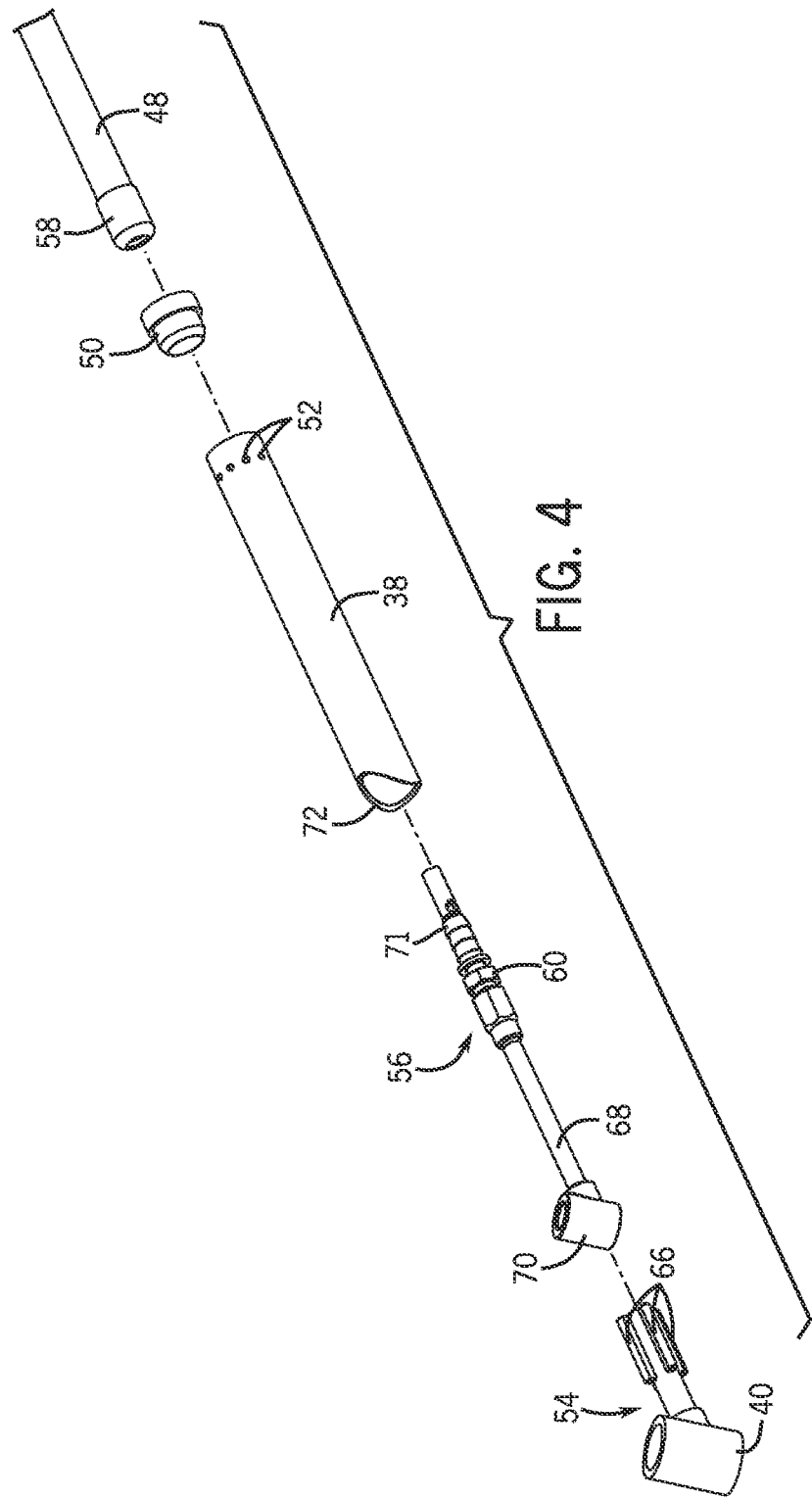
FIG. 4 is an exploded perspective view of certain components of the TIG torch of FIG. 1.

An exploded perspective view of certain components of the TIG torch 16 is illustrated in FIG. 4. To assemble the torch 16, the fastener assembly 56 may be coupled to a skeleton 68, which features a collar 70 configured to hold the collet, insulator 42, nozzle 44, back cap 46, and the like. The torch body 54 may be disposed over the skeleton 68 such that the collar 70 and the torch head 40 are aligned concentrically. Further, the ferrule 58 of the cable assembly 48 is coupled with a fitting 71 of the fastener assembly 56 to allow the flow of welding power and shielding gas to the torch head 40. Still further, a curved edge 72 is formed in the end of the handle 38 designed to approach the torch head 40. The curvature of this edge 72, discussed in detail below, may allow the handle 38 to nearly wrap around the torch head 40 without contacting the torch head 40. Finally, the handle 38 may be disposed over the cable assembly 48 and the torch body 54, supported around these components by the handle supports 66 at one end and by the plug 50 at the other. The handle supports 66 provide minimal attachment between the torch body 54 and the handle 38 so that air may flow within the handle 38, even at a close proximity to the torch head 40.

Figure 5:
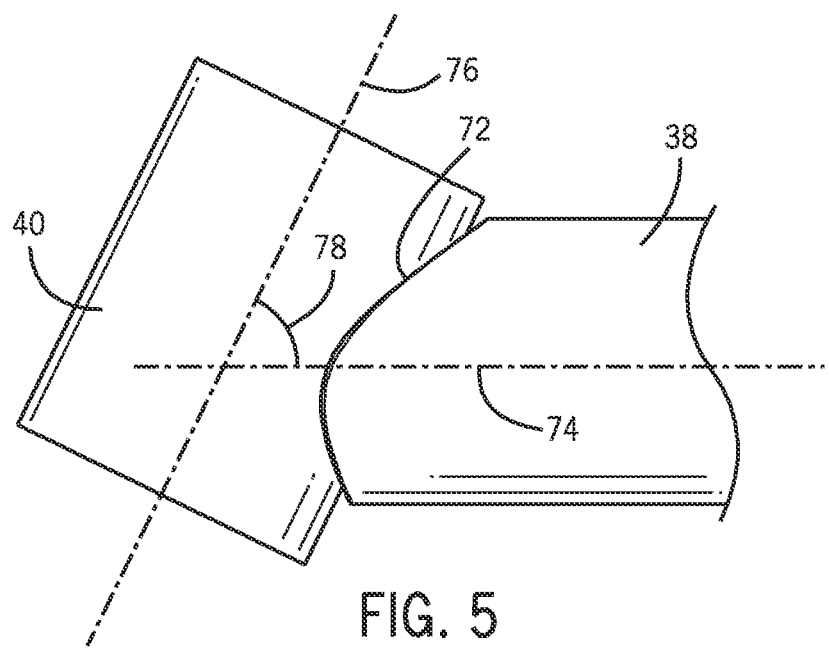
FIG. 5 is a side view of the torch head and handle of the TIG torch of FIG. 1.
Figure 6:
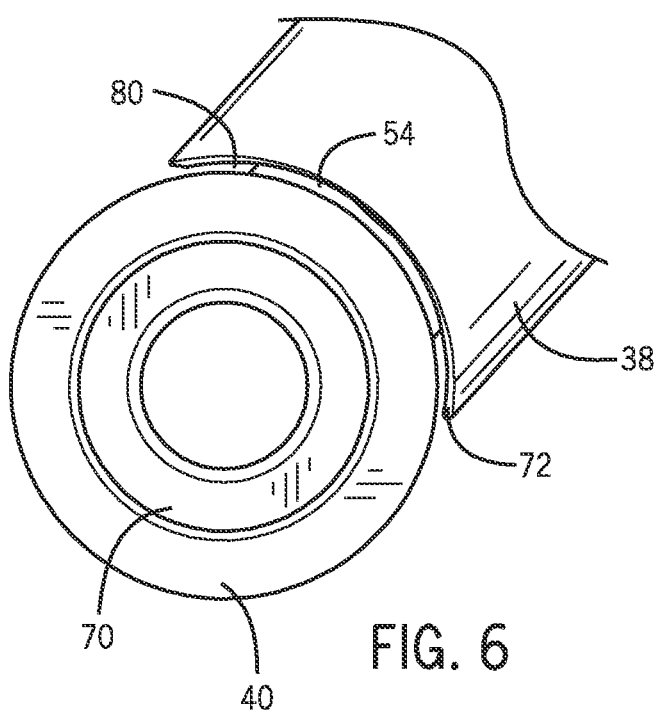
FIG. 6 is a top view of the torch head and handle of the TIG torch of FIG. 1.

The unique shape of the curved edge 72 is illustrated in FIGS. 5-6, which provide a side view and top view of the torch head 40 and the connected handle 38. In FIG. 5, a centerline 74 defines the alignment of the handle 38 and another centerline 76 defines the alignment of the torch head 40. The intersecting centerlines 74 and 76 form a head angle 78 that is generally not equal to ninety degrees (i.e., is inclined). TIG welding operators may desire a torch 16 with a non-ninety degree head angle 78 for easier positioning and control of the arc between the electrode 36 and the work piece 20. In fact, some welding torches may feature flexible torch neck structures that allow a welding operator to adjust the head angle as desired. Due to the close proximity of the handle 38 to the torch head 40 in the present invention, the curved edge 72 may conform to the outer shape of the torch head 40, specifically as the torch head 40 is positioned at a fixed non-ninety degree head angle 78.

FIG. 6 provides a top view of the torch head 40 and the handle 38, showing a space 80 between the handle 38 and the torch head 40. Air may enter the air space 62 between the torch body 54 and the handle 38 through this space 80, then flow through the handle 38 before exiting via the apertures 52. In addition to permitting entry of air to the air space 62, the space 80 may prevent heat conduction from the torch head 40 to the handle 38, contributing to a relatively cooler outer surface of the handle 38. The curved edge 72 of the handle 38 is configured to fit closely around a portion of the circumference of the torch head 40. In the illustrated embodiment, the curved edge 72 forms a curve where each point along the curve is equidistant from the center of the torch head 40. Consequently, the amount of space 80 between the torch head 40 and the handle 38 may be the same along the curved edge 72. This allows the handle 38 to fit relatively near the torch head 40 without transferring an undesired amount of heat from the torch head 40 to the handle 38.

Extending the handle 38 closer to the torch head 40, as described in the present disclosure, may allow a TIG welding operator to comfortably grasp the handle 38 at a point closer to the torch head 40, providing control and comfort for the welding operator using the welding torch 16. The air space 62 defined by the torch body 54, fastener assembly 56, cable assembly 48, and plug 50 may allow air to circulate, convectively cooling inner elements of the torch 16 and insulating the handle 38. The handle supports 66 provide a minimal attachment point between the handle 38 and the heated torch body 54, further lessening heat transferred by conduction to the handle 38. As such, the welding torch 16 described herein may allow more desirable control for the welding operator and may support the use of the air-cooled welding torch 16 for higher amperage TIG welding applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tungsten inert gas (TIG) welding torch, comprising:
 a collar configured to hold an electrode in a stationary position in relation to the collar and conduct welding power to the electrode;
 a body coupled to the collar, the body comprising a plurality of supports disposed circumferentially about the body;
 a channel through the body;
 a cable assembly coupled to the body and extending through the channel to supply electrical power and gas to the electrode; and
 a hollow handle disposed around the body, wherein an interior surface of the handle contacts the plurality of supports, defining a first air space between the body and the handle, the handle having a contoured end configured to fit proximate to but not contact an outer surface of the collar and to follow an exterior contour of the collar such that the handle is spaced from the collar by a second air space between the handle and the collar to allow cooling air flow through the second air space between the handle and the collar to convectively cool inner components of the welding torch and to prevent heat conduction from the collar to the handle.

2. The TIG welding torch of claim 1, wherein the collar comprises a cylindrical collar.

3. The TIG welding torch of claim 1, wherein an end of the handle distal the contoured end abuts a plug coupled to the cable assembly.

4. The TIG welding torch of claim 3, wherein the handle, the body, the cable assembly, and the plug define the first air space configured to allow passage of air for cooling the handle.

5. The TIG welding torch of claim 1, wherein the handle comprises apertures for admitting air in or out of the first air space.

6. The TIG welding torch of claim 5, wherein the apertures are arranged radially around the handle.

7. The TIG welding torch of claim 5, wherein the apertures are equally spaced.

8. A tungsten inert gas (TIG) welding torch, comprising:
 a collar configured to hold an electrode in a stationary position in relation to the collar and conduct welding power to the electrode, and having an axis defined by a collar centerline;
 a body coupled to the collar, the body comprising a plurality of supports disposed circumferentially about the body;
 a channel through the body with an axis defined by a body centerline, the body centerline intersecting the collar centerline at a non-ninety degree angle;

a cable assembly coupled to the body and extending through the channel to supply electrical power and gas to the welding torch; and a hollow handle disposed around the body, wherein an interior surface of the handle contacts the plurality of supports, defining a first air space between the body and the handle, the handle being aligned with the body centerline and having a contoured end configured to fit proximate to but not contact an outer surface of the collar and to follow an exterior contour of the collar such that the handle is spaced from the collar by a second air space between the handle and the collar to allow cooling air flow through the second air space between the handle and the collar to convectively cool inner components of the welding torch and to prevent heat conduction from the collar to the handle.

9. The TIG welding torch of claim 8, wherein the collar comprises a cylindrical collar.

10. The TIG welding torch of claim 8, wherein the non-ninety degree angle of intersection between the body centerline and the collar centerline comprises a fixed non-ninety degree angle.

11. The TIG welding torch of claim 8, wherein an end of the handle distal the contoured end abuts a plug coupled to the cable assembly.

12. The TIG welding torch of claim 11, wherein the handle, the body, the cable assembly, and the plug define the first air space configured to allow passage of air for cooling the handle.

13. The TIG welding torch of claim 8, wherein the handle comprises apertures for admitting air in or out of the first air space.

14. The TIG welding torch of claim 13, wherein the apertures are arranged radially around the handle.

15. The TIG welding torch of claim 13, wherein the apertures are equally spaced.

16. The TIG welding torch of claim 1, wherein the collar is configured to secure the electrode in a stationary position in relation to the collar.

17. The TIG welding torch of claim 8, wherein the collar is configured to secure the electrode in a stationary position in relation to the collar.

18. The TIG welding torch of claim 1, wherein the handle includes a curved end, or a curved edge, configured to fit closely to a torch head.

\* \* \* \* \*